(12) United States Patent
Massa et al.

(10) Patent No.: US 10,052,714 B2
(45) Date of Patent: Aug. 21, 2018

(54) ULTRASONIC WELDING DEVICE WITH DUAL CONVERTERS

(71) Applicants: John Massa, Waterbury, CT (US); William P. Simon, New Milford, CT (US)

(72) Inventors: John Massa, Waterbury, CT (US); William P. Simon, New Milford, CT (US)

(73) Assignee: Sonics & Materials, Inc., Newtown, CT (US)

(*) Notice: Subject to any disclaimer, the term of this patent is extended or adjusted under 35 U.S.C. 154(b) by 35 days.

(21) Appl. No.: 15/293,825

(22) Filed: Oct. 14, 2016

(65) Prior Publication Data
US 2018/0104764 A1 Apr. 19, 2018

(51) Int. Cl.
B23K 20/10 (2006.01)

(52) U.S. Cl.
CPC ............ *B23K 20/106* (2013.01); *B23K 20/10* (2013.01)

(58) Field of Classification Search
CPC ......... B23K 1/06; B23K 20/10; B23K 20/106
USPC ................... 228/1.1, 110.1; 156/73.1–73.4, 156/580.1–580.2
See application file for complete search history.

(56) References Cited

U.S. PATENT DOCUMENTS

| 3,017,792 | A | * | 1/1962 | Elmore | ..................... B06B 3/00 228/1.1 |
| 3,039,333 | A | * | 6/1962 | Jones | ................... B23K 20/106 228/1.1 |
| 3,088,343 | A | * | 5/1963 | Kuris | ................... B23K 20/103 228/1.1 |
| 3,212,312 | A | * | 10/1965 | Boyd | ....................... B01J 19/10 228/1.1 |
| 3,439,409 | A | * | 4/1969 | Bodine, Jr. | .......... B23K 20/106 228/1.1 |
| 3,581,969 | A | * | 6/1971 | Bodine | ................ B23K 20/106 156/73.1 |
| 3,702,674 | A | * | 11/1972 | Bodine | ................ B23K 20/106 156/73.1 |
| 3,873,859 | A | * | 3/1975 | Shoh | ....................... B29C 65/08 228/1.1 |
| 5,494,207 | A | * | 2/1996 | Asanasavest | ........ B23K 20/106 228/1.1 |

(Continued)

FOREIGN PATENT DOCUMENTS

| CN | 101767456 A | 7/2010 |
| EP | 1060798 A1 | 12/2000 |

(Continued)

OTHER PUBLICATIONS

Camillo, Jim, "Ultrasonic Welding with a Twist", Oct. 1, 2012, 19 pages. Retrieved from: http://www.assemblymag.com/articles/90529-ultrasonic-welding-with-a-twist.

*Primary Examiner* — Kiley Stoner
(74) *Attorney, Agent, or Firm* — Forge IP, PLLC

(57) ABSTRACT

An ultrasonic welding device including a sonotrode having a central weld region adjacent to an anvil, a first converter providing mechanical vibrations to a proximal end of the sonotrode, a second converter providing mechanical vibrations to a distal end of the sonotrode in a direction opposite to the first converter, a power supply delivering electrical energy to each of the first and second converters, and the mechanical vibrations received by the sonotrode from the first converter being in phase with the mechanical vibrations received from the second converter.

15 Claims, 3 Drawing Sheets

(56) References Cited

U.S. PATENT DOCUMENTS

| | | | |
|---|---|---|---|
| 5,697,545 A * | 12/1997 | Jennings | B23K 20/10 |
| | | | 156/580.2 |
| 5,699,950 A | 12/1997 | Jang | |
| 5,730,832 A * | 3/1998 | Sato | B23K 20/10 |
| | | | 156/499 |
| 5,772,100 A | 6/1998 | Patrikios | |
| 6,078,125 A * | 6/2000 | Roberts | B06B 3/02 |
| | | | 228/1.1 |
| 6,247,628 B1 | 6/2001 | Sato et al. | |
| 6,605,178 B1 | 8/2003 | Shinohara et al. | |
| 7,984,839 B2 | 7/2011 | Buttiker | |
| 8,376,016 B2 | 2/2013 | Hull | |
| 8,657,182 B2 | 2/2014 | Buettiker | |
| 8,887,784 B2 | 11/2014 | Thaerigen | |
| 8,899,295 B2 | 12/2014 | Vogler | |
| 8,950,458 B2 | 2/2015 | Patrikios et al. | |
| 9,865,562 B2 * | 1/2018 | Sugito | H01L 24/78 |
| 2003/0168938 A1 * | 9/2003 | Wallaschek | B06B 3/00 |
| | | | 310/328 |
| 2004/0038598 A1 * | 2/2004 | Steiner | B23K 20/10 |
| | | | 439/894 |
| 2007/0144680 A1 * | 6/2007 | Kawada | B06B 3/00 |
| | | | 156/580.1 |
| 2010/0320257 A1 * | 12/2010 | Buttiker | B23K 20/10 |
| | | | 228/110.1 |
| 2011/0266329 A1 * | 11/2011 | Hesse | B23K 20/002 |
| | | | 228/110.1 |
| 2012/0125977 A1 * | 5/2012 | DeAngelis | B23K 20/007 |
| | | | 228/110.1 |
| 2013/0075454 A1 * | 3/2013 | Buettiker | B06B 3/00 |
| | | | 228/110.1 |
| 2013/0213580 A1 * | 8/2013 | Thaerigen | B06B 3/00 |
| | | | 156/580.2 |
| 2013/0240605 A1 * | 9/2013 | Wong | H01L 24/78 |
| | | | 228/1.1 |
| 2013/0284379 A1 * | 10/2013 | Patrikios | B06B 3/00 |
| | | | 156/580.1 |
| 2015/0210003 A1 | 7/2015 | Short et al. | |
| 2016/0052658 A1 | 2/2016 | Solenthaler | |
| 2016/0067912 A1 | 3/2016 | Schneider et al. | |
| 2016/0325312 A1 * | 11/2016 | Gmeiner | B06B 3/00 |
| 2017/0005064 A1 * | 1/2017 | Sugito | B23K 20/005 |
| 2017/0005065 A1 * | 1/2017 | Sugito | H01L 24/78 |

FOREIGN PATENT DOCUMENTS

| | | | |
|---|---|---|---|
| EP | 2286931 A1 | 2/2011 | |
| GB | 895413 A * | 5/1962 | B23K 20/106 |

* cited by examiner

ULTRASONIC WELDING DEVICE WITH DUAL CONVERTERS

FIELD OF THE INVENTION

The invention relates to an ultrasonic welding device, and more specifically to an ultrasonic welding device with dual converters.

BACKGROUND OF THE INVENTION

Ultrasonic welding is an industrial process involving high frequency ultrasonic acoustic vibrations that are locally applied to workpieces being held together under pressure to create a solid-state weld. This process has applications in the electrical/electronic, automotive, aerospace, appliance, and medical industries and is commonly used for plastics and especially for joining dissimilar materials. Ultrasonic welding of thermoplastics results in local melting of the plastic due to absorption of vibration energy. The vibrations are introduced across the joint to be welded. In metals, ultrasonic welding occurs due to high-pressure dispersion of surface oxides and local motion of the materials. Vibrations are introduced along the joint being welded.

U.S. Pat. No. 8,950,458, incorporated herein by reference, provides an example of an ultrasonic welding system. Ultrasonic welding systems typically include a press to apply pressure to the two parts to be assembled under pressure, a nest or anvil where the parts are placed for allowing high frequency vibrations to be directed to the interfaces of the parts, an ultrasonic stack that includes a converter for converting the electrical signal into a mechanical vibration, an optional booster for modifying the amplitude of the vibration, a sonotrode or "horn" for applying the mechanical vibration to the parts to be welded, an electronic ultrasonic generator or power supply delivering a high power AC signal, and a controller for controlling the movement of the press and the delivery of the ultrasonic energy.

The power supply provides high-frequency electrical power to the piezoelectric-based transducer, creating a high-frequency mechanical vibration at the end of the transducer. This vibration is transmitted to the sonotrode (e.g., via the booster) which transmits the vibrations to workpieces. The workpieces, usually two thin sheets of metal in a simple lap joint, are firmly clamped between the sonotrode and a rigid anvil by a static force. The top workpiece is gripped against the moving sonotrode by a knurled pattern on the sonotrode surface. Likewise, the bottom workpiece is gripped against the anvil by a knurled pattern on the anvil. The ultrasonic vibrations of the sonotrode, which are parallel to the workpiece surfaces, create the relative friction-like motion between the interface of the workpieces, causing the deformation, shearing, and flattening of surface asperities.

Welding system components, commonly referred to as the transmission line or "stack", are typically housed in an enclosure case that grips the welding assembly at critical locations (most commonly the anti-node) so as to not dampen the ultrasonic vibrations, and to provide a means of applying a force to and moving the assembly to bring the sonotrode into contact with the workpieces and apply the static force.

Ultrasonic welding systems typically include only one transducer or converter situated on one side of the sonotrode. In order to boost power, attempts have been made to use multiple converters. However, using more than one converter can lead to difficulties keeping the vibrations synchronized and in phase with one another.

U.S. Pat. No. 7,984,839 to Büttiker discloses an ultrasonic device with longitudinal and torsional sonotrodes and two converters operated by a generator. US 2015/0210003 to Short et al. discloses a transverse sonotrode for ultrasonic welding which, in some cases, may include a second transducer. However, neither Büttiker nor Short is concerned with ensuring that the converters are in phase.

U.S. Publication No. 2016/0067912 to Schneider discloses an ultrasonic welding apparatus with a plurality of sonotrodes and a plurality of converters. In order to avoid an undesirable interaction occurring between the two sonotrodes, the converter excites the first sonotrode at a frequency fs1 the second sonotrode at a frequency fs2, fs2 being greater than fs1. Yet, Schneider does not disclose ensuring that multiple converters are in phase with one another.

It is therefore desired to provide an ultrasonic welding system with high power delivered in an effective way such that power is delivered in phase.

SUMMARY OF THE INVENTION

Accordingly, it is an object of the present invention to provide an ultrasonic welding system with at least two converters that are kept in phase with one another.

These and other objects are achieved by providing an ultrasonic welding device including a sonotrode having a central weld region adjacent to an anvil, a first converter providing mechanical vibrations to a proximal end of the sonotrode, and a second converter providing mechanical vibrations to a distal end of the sonotrode in a direction opposite to the first converter. The device further includes a power supply delivering electrical energy to each of the first and second converters. The mechanical vibrations received by the sonotrode from the first converter being in phase with the mechanical vibrations received from the second converter.

In some embodiments, the second converter includes piezo elements having an arrangement that is reversed as compared to an arrangement of piezo elements in the first converter. The piezo elements may be quartz crystals.

In some embodiments, a first booster is mounted between the first converter and the proximal end of the sonotrode, and a second booster is mounted between the second converter and the distal end of the sonotrode. The first booster may have a length different than a length of the second booster. In particular, the length of the second booster may provide a half wave phase difference from the first booster.

Further provided is a method of ultrasonic welding, including the step of providing electrical energy from a power supply to both a first converter and a second converter, the first converter mounted to a proximal end of a sonotrode and the second converter mounted to a distal end of the sonotrode. The sonotrode receives mechanical vibrations propagating in a first direction from the first converter to the proximal end of the sonotrode and receives mechanical vibrations propagating in a second opposite direction from the second converter to the distal end of the sonotrode. The vibrations from the first converter and the second converter are in phase with one another. The sonotrode acts on a work piece positioned between the sonotrode and an anvil.

Other objects of the invention and its particular features and advantages will become more apparent from consideration of the following drawings and accompanying detailed description.

DETAILED DESCRIPTION OF THE INVENTION

Figure 1:
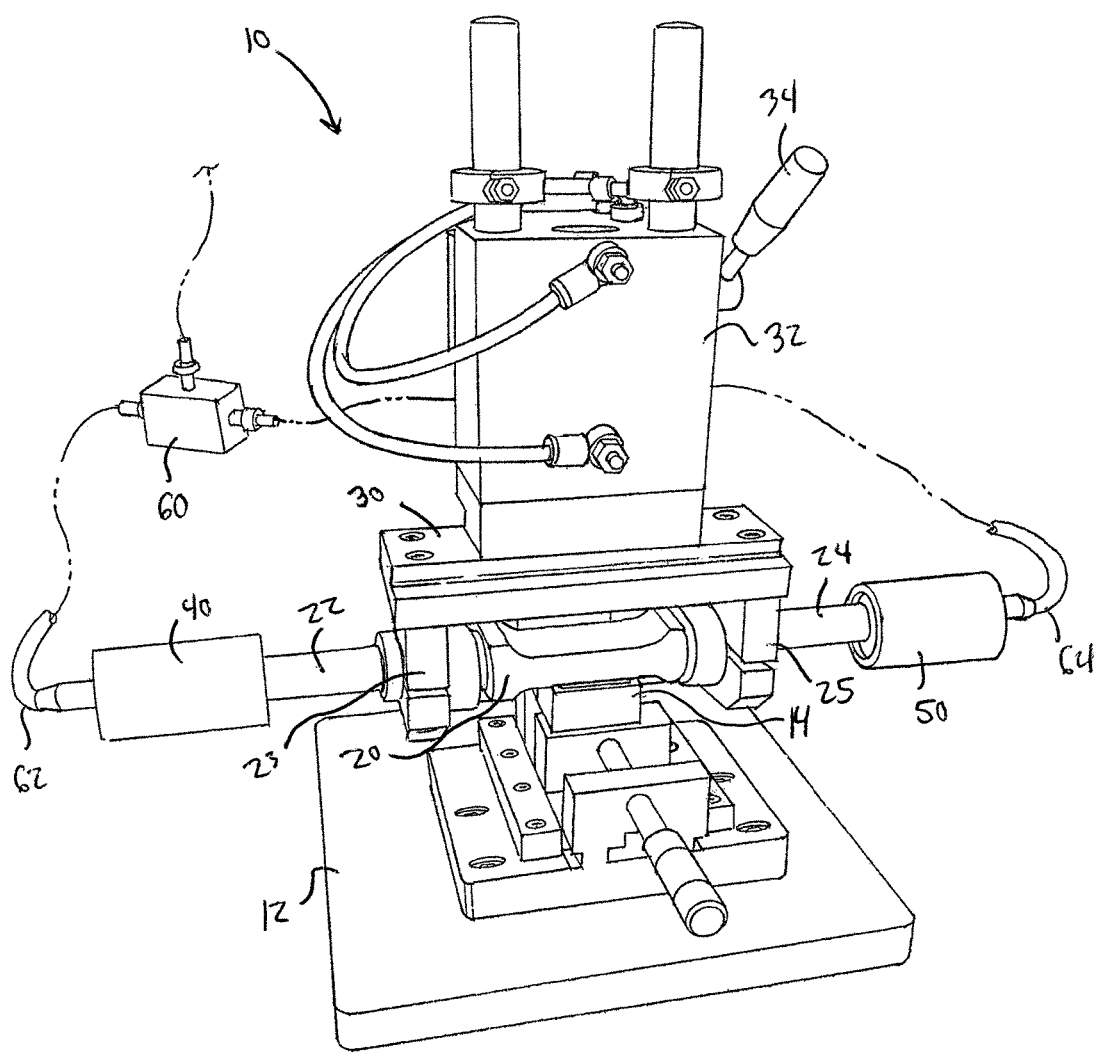
FIG. 1 is welding system according to an exemplary embodiment of the present invention.

FIG. 1 illustrates an ultrasonic welding system or device 10 according to the present invention. The device 10 includes a base plate 12 with an anvil 14. A sonotrode 20 is positioned above and/or adjacent to the anvil 14 to receive work pieces there-between. The device 10 may further include two extension pieces or boosters 22, 24. The sonotrode 20 and/or extension pieces 22, 24 are attached to a housing 30 via rigid mounts 23/25. The housing 30 may also include a press 32 to press working pieces together via a handle 34 or controller.

As shown in FIG. 1, the device 10 includes two converters to provide mechanical vibrations to the sonotrode 20 in two opposite directions. In particular, a first converter 40 is mounted on a first end and a second converter 50 is mounted on a second end. By having two converters 40/50, the device 10 can achieve higher power or energy to deliver to the work pieces. Each of the converters is powered by a power supply 60, such as an ultrasonic generator. The power supply 60 provides high frequency AC electrical energy, such as 35-40 kHz, which is then split between the two converters 40/50.

The converters 40/50 are preferably piezoelectric-based converters or transducers. The converters 40/50 each receive high-frequency (e.g., 20 kHz) electrical energy from the power supply 60 and deliver high-frequency mechanical vibration to the sonotrode 20. The boosters 22, 24 receive, and in some cases increase the amplitude of, the mechanical vibrations.

Figure 2:
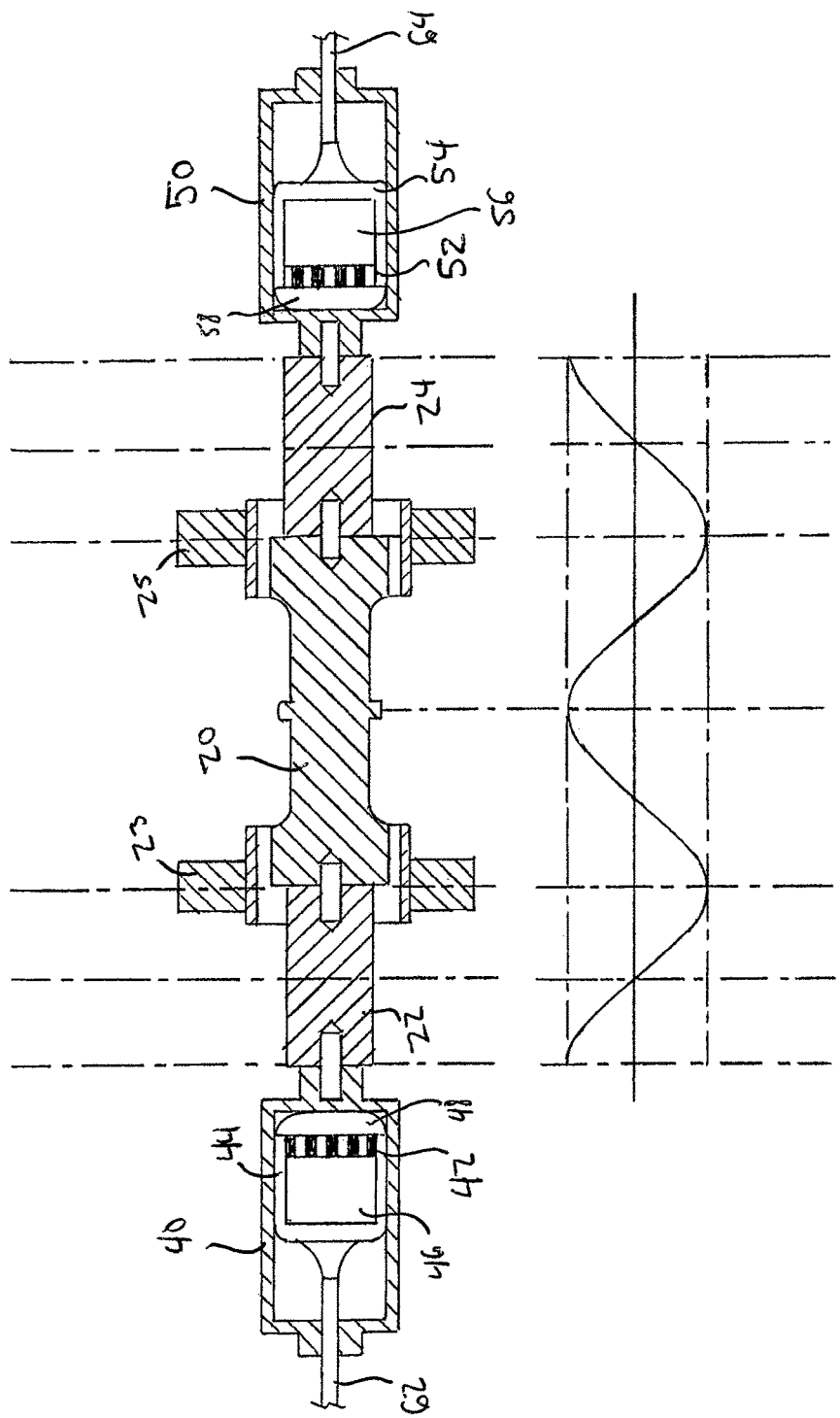
FIG. 2 is cutaway view of the welding system of FIG. 1, including a sonotrode and dual converters.

FIG. 2 is cutaway view of the welding device 10 including the sonotrode 20 and the dual converters 40/50. As shown, each of the converters 40/50 includes an arrangement of electrically excitable piezo elements 42/52. The piezo elements may be, for example, quartz crystals or ceramic elements. In some embodiments, each of the converters 40/50 may also include an outer casing 44/54, a damper or backing block 46/56, and an end layer 48/58. However, the invention is not limited to this particular arrangement. As one skilled in the art will understand, by passing electricity through the piezo elements 42/52, they vibrate back and forth to generate the mechanical vibrations.

Given that the converters 40/50 are directing mechanical vibrations toward one another in opposite directions, there is a risk that the vibrations will be out of phase with one another. This could potentially negate or at least lessen the potential advantage in increased power provided by the two converters 40/50. Thus, the present invention seeks to synchronize the converters 40/50 in phase such that they deliver maximum power to the sonotrode without acting against one another. The crystals of one of the converters, e.g., crystals 52 in converter 50, are therefore reversed to ensure that the two converters 40/50 act in phase with one another. For example, the crystals 52 may be turned over to change the polarity of the converter 50 and/or the direction of the converter 50 may be reversed.

Figure 3:
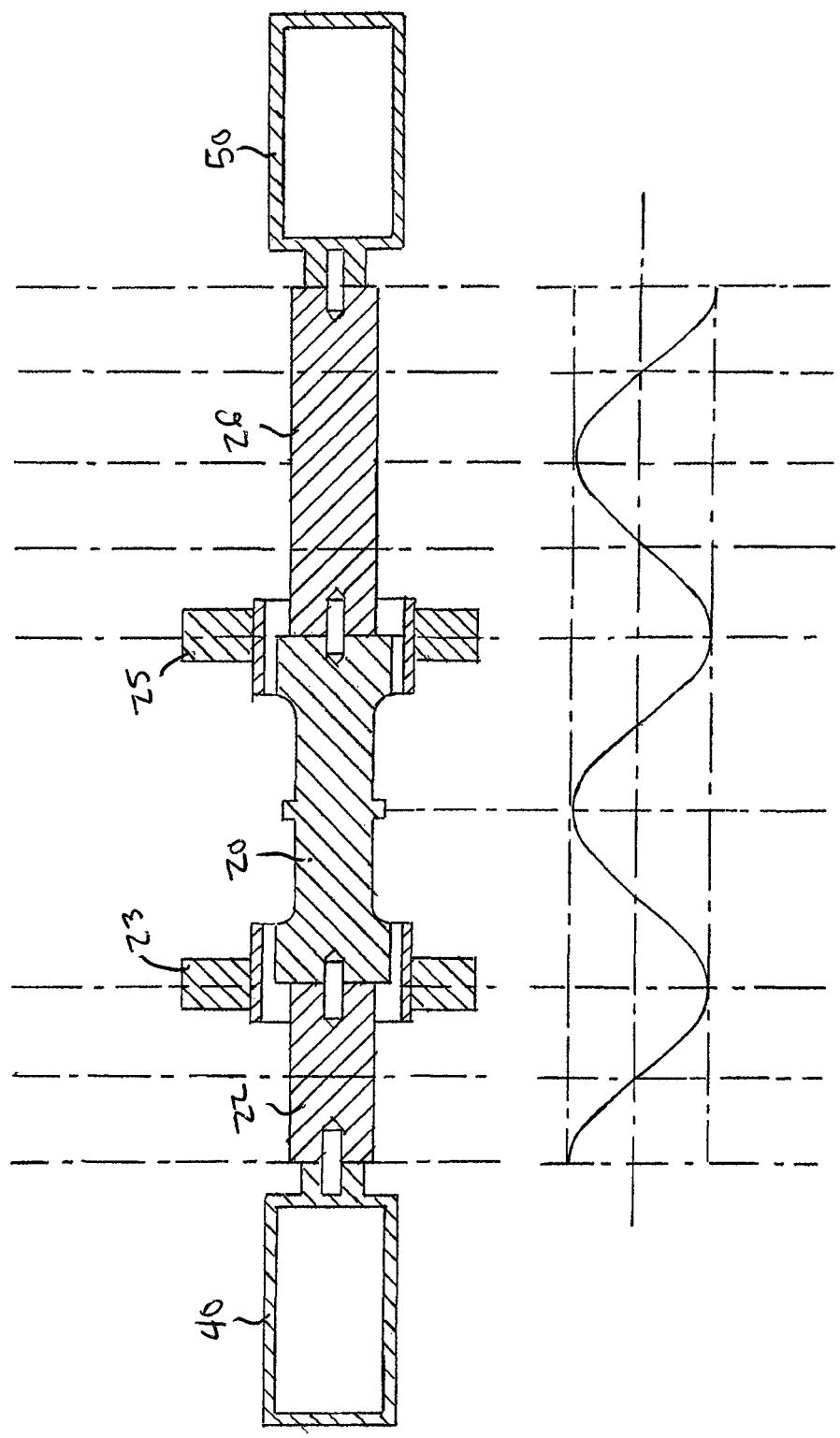
FIG. 3 is another cutaway view of the welding system of FIG. 1, including the sonotrode, dual converters, and asymmetrical boosters.

Alternatively (or in combination), one of the boosters or extension pieces may be longer to ensure that the mechanical energy from the two converters 40/50 is in phase. As shown in FIG. 3, a booster 26 may be included to prove an additional half wave to the device 10.

The system and device according to the present invention may be used in a method of ultrasonic welding. In particular, the method includes providing electrical energy from the power supply 60 to both converters 40/50, the first converter 40 mounted to a proximal end of the sonotrode 20 and the second converter 50 mounted to a distal end of the sonotrode 20. The sonotrode 20 receives mechanical vibrations propagating in a first direction from the first converter 40 to the proximal end of the sonotrode 20 and receives mechanical vibrations propagating in a second opposite direction from the second converter 50 to the distal end of the sonotrode 20. The vibrations from the first converter 40 and the second converter 50 are in phase with one another. The sonotrode 20 acts on a work piece positioned between the sonotrode 20 and an anvil 14.

Although the invention has been described with reference to a particular arrangement of parts, features and the like, these are not intended to exhaust all possible arrangements or features, and indeed many modifications and variations will be ascertainable to those of skill in the art.

What is claimed is:

1. An ultrasonic welding device, comprising:
   a sonotrode having a proximal end and a distal end with a central weld region therebetween, the proximal end, the distal end and the central weld region being disposed along a longitudinal axis of said sonotrode, and the central weld region being adjacent to an anvil;
   a first converter providing mechanical vibrations to the proximal end of said sonotrode;
   a second converter providing mechanical vibrations to the distal end of said sonotrode in a direction opposite to said first converter;
   a power supply delivering electrical energy to each of said first and second converters;
   the mechanical vibrations received by said sonotrode from said first converter being in phase with the mechanical vibrations received from said second converter; and
   wherein said second converter includes piezo elements having an arrangement that is reversed as compared to an arrangement of piezo elements in said first converter.

2. The device according to claim 1, wherein the piezo elements in each of said first and second converters are quartz crystals.

3. The device according to claim 1, wherein a polarity of the first converter is different from a polarity of the second converter.

4. The device according to claim 1, further comprising:
   a first booster mounted between said first converter and the proximal end of said sonotrode; and
   a second booster mounted between said second converter and the distal end of said sonotrode.

5. The device according to claim 4, wherein said first booster has a length different than a length of said second booster.

6. The device according to claim 5, wherein the length of the second booster provides a half wave phase difference from the first booster.

7. The device according to claim 4, further comprising a housing having mounts to receive said first and second boosters.

8. The device according to claim 7, wherein the housing includes a press and a handle to activate the press.

9. The device according to claim 1, wherein the power supply delivers electrical energy at a frequency of at least 35 kHz, wherein the electrical energy is split between said first and second converters.

10. A method of ultrasonic welding, comprising the steps of:

provyding a sonotrode having a proximal end and a distal end with a central weld region therebetween, the proximal end, the distal end and the central weld region being disposed along a longitudinal axis of the sonotrode, and the central weld region being adjacent to an anvil;

providing electrical energy from a power supply to both a first converter and a second converter, the first converter mounted to the proximal end of the sonotrode and the second converter mounted to the distal end of the sonotrode;

the sonotrode receiving mechanical vibrations propagating in a first direction from the first converter to the proximal end of the sonotrode and receiving mechanical vibrations propagating in a second opposite direction from the second converter to the distal end of the sonotrode;

wherein the vibrations from the first converter and the second converter are in phase with one another, and wherein the sonotrode acts on a work piece positioned between the sonotrode and the anvil; and wherein said second converter includes piezo elements having an arrangement that is reversed as compared to an arrangement of piezo elements in said first converter.

11. The method according to claim 10, wherein the piezo elements in each of said first and second converters are quartz crystals.

12. The method according to claim 10, wherein a polarity of the first converter is different from a polarity of the second converter.

13. The method according to claim 10, wherein the first converter is mounted to the proximal end of the sonotrode via a first booster and the second converter is mounted to the distal end of the sonotrode via a second booster.

14. The method according to claim 13, wherein the first booster has a length different than a length of the second booster.

15. The method according to claim 14, wherein the second booster provides a half wave phase difference from the first booster.

* * * * *